(12) United States Patent
Yuasa et al.

(10) Patent No.: US 12,466,125 B2
(45) Date of Patent: Nov. 11, 2025

(54) GRANULAR MATERIAL FOR THERMAL FUSION TYPE THREE-DIMENSIONAL PRINTERS, METHOD FOR PRODUCING SHAPED ARTICLE, AND FILAMENT

(71) Applicant: KYORAKU CO., LTD., Kyoto (JP)

(72) Inventors: Ryohei Yuasa, Yamato (JP); Takashi Nomura, Yamato (JP)

(73) Assignee: KYORAKU CO., LTD., Kyoto (JP)

(*) Notice: Subject to any disclaimer, the term of this patent is extended or adjusted under 35 U.S.C. 154(b) by 239 days.

(21) Appl. No.: 17/760,643

(22) PCT Filed: Sep. 25, 2020

(86) PCT No.: PCT/JP2020/036216
§ 371 (c)(1),
(2) Date: Mar. 15, 2022

(87) PCT Pub. No.: WO2021/060451
PCT Pub. Date: Apr. 1, 2021

(65) Prior Publication Data
US 2022/0332041 A1 Oct. 20, 2022

(30) Foreign Application Priority Data

Sep. 26, 2019 (JP) .................. 2019-175608
Sep. 30, 2019 (JP) .................. 2019-179419

(51) Int. Cl.
*B29C 64/106* (2017.01)
*B29K 21/00* (2006.01)
(Continued)

(52) U.S. Cl.
CPC .......... *B29C 64/106* (2017.08); *B29C 64/118* (2017.08); *B29K 2021/003* (2013.01); *B33Y 10/00* (2014.12); *B33Y 70/00* (2014.12)

(58) Field of Classification Search
CPC ................ B29C 64/118; B29C 64/106; B29K 2021/003; B33Y 10/00; B33Y 70/00
See application file for complete search history.

(56) References Cited

U.S. PATENT DOCUMENTS

2010/0283173 A1* 11/2010 Kenny .................. B29C 48/919
264/171.13
2014/0053311 A1 2/2014 Nordstrom et al.
(Continued)

FOREIGN PATENT DOCUMENTS

JP 2007-268940 A 10/2007
JP 2009-500194 A 1/2009
(Continued)

OTHER PUBLICATIONS

JP 2017177497A Translation (Year: 2017).*
(Continued)

*Primary Examiner* — Jerzi H Moreno Hernandez
(74) *Attorney, Agent, or Firm* — Maier & Maier, PLLC

(57) ABSTRACT

A granular material for a fused deposition three-dimensional printer that enables a flexible molded object to be manufactured with high precision. A granular material for a fused deposition three-dimensional printer is provided. The granular material is formed of a thermoplastic elastomer, and the thermoplastic elastomer has, at at least one of the measurement temperature of 120 to 270° C., a loss tangent tan δ of 0.40 or more and a loss modulus G" of 11000 Pa or less, which are measured with a rotary rheometer having a pair of parallel plates with a diameter of 20 mm and a measurement gap of 1.3 mm at a frequency of 1 Hz.

9 Claims, 11 Drawing Sheets

(51) Int. Cl.
  *B33Y 10/00*   (2015.01)
  *B33Y 70/00*   (2020.01)
  *B29C 64/118*  (2017.01)

(56) References Cited

U.S. PATENT DOCUMENTS

| | | | |
|---|---|---|---|
| 2014/0053312 A1 | 2/2014 | Nordstrom et al. | |
| 2016/0200024 A1* | 7/2016 | Kim | B29C 64/118 425/375 |
| 2017/0151728 A1 | 6/2017 | Kunc et al. | |
| 2018/0038015 A1 | 2/2018 | Sano et al. | |
| 2019/0009472 A1* | 1/2019 | Mark | B29C 64/393 |
| 2019/0254439 A1 | 8/2019 | Achten et al. | |
| 2019/0390071 A1 | 12/2019 | Yuasa et al. | |
| 2020/0398478 A1 | 12/2020 | Hirano et al. | |
| 2022/0259465 A1* | 8/2022 | Kugel | B29C 64/118 |

FOREIGN PATENT DOCUMENTS

| | | | |
|---|---|---|---|
| JP | 2015036383 A | | 2/2015 |
| JP | 2015-531833 A | | 11/2015 |
| JP | 2017177497 A | * | 10/2017 |
| JP | 2018051917 A | * | 4/2018 |
| JP | 2018094746 A | | 6/2018 |
| JP | 2018-122466 A | | 8/2018 |
| JP | 2018122580 A | * | 8/2018 |
| JP | 2019084769 A | | 6/2019 |
| WO | 2007005236 A1 | | 1/2007 |
| WO | 2018057784 A1 | | 3/2018 |
| WO | 2018207242 A1 | | 11/2018 |
| WO | 2019151235 A1 | | 8/2019 |

OTHER PUBLICATIONS

JP2018051717 Espacenet Translation (Year: 2024).*
JP2018122580 Espacenet Translation (Year: 2024).*
Translation of JP2018051917 (Year: 2024).*
Translation of JP2018122580 (Year: 2024).*
International Search Report mailed on Dec. 1, 2020, in corresponding to International Application No. PCT/JP2020/036216; 8 pages (with English Translation).
Office Action Issued on Feb. 7, 2023, in corresponding Japanese Application No. 2019175608; 6 pages (partial English translation provided).
NPL1 Partial Supplementary Search Report issued on Mar. 11, 2024, in corresponding European Application No. 20867959.7, 13 pages.
Office Action issued on Nov. 13, 2024 in corresponding Chinese Application No. 202080067703.X, 12 pages.

* cited by examiner

GRANULAR MATERIAL FOR THERMAL FUSION TYPE THREE-DIMENSIONAL PRINTERS, METHOD FOR PRODUCING SHAPED ARTICLE, AND FILAMENT

TECHNICAL FIELD

The present invention relates to a granular material for heat-fusion type three-dimensional printers, a method for manufacturing molded object, and a filament.

BACKGROUND (First Viewpoint)

Patent Literature 1 discloses a method for forming a molded object by supplying a filament as a molding material to an extrusion head, melting the filament in a liquefier mounted on the extrusion head, and extruding the molten filament onto a base through a nozzle.

In such a method, the filament is generally fed directly to a distal end of the nozzle by meshing of a gear or the like. In this regard, if the filament is formed of a highly flexible thermoplastic elastomer, the gear may not engage with the filament and the filament may not be supplied to the distal end of the nozzle.

In Patent Literature 2, the above problem is solved by using a filament in which a linear reinforcing portion is provided on a part of the outer peripheral surface of a core material portion containing a thermoplastic elastomer.

(Second Viewpoint)

Patent Literature 3 discloses a filament containing a shape memory polymer and an inorganic filler.

PATENT LITERATURE

Patent Literature 1: JP-A-2009-500194
Patent Literature 2: JP-A-2017-177497
Patent Literature 3: JP-A-2018-122466

SUMMARY (First Viewpoint)

However, the linear reinforcing portion is molded together in the method of Patent Literature 2. Therefore, in order to obtain a molded object formed of only an elastomer, it is necessary to dissolve the linear reinforcing portion with water or organic solvent after molding by the three-dimensional printer. Such a process is troublesome and may also degrade the quality of the molded object.

Further, when the thermoplastic elastomer is used, the distance between line portions forming the molded object may be widened to particularly increase the flexibility of the molded object. However, the shape of the molded object tends to collapse, depending on the material used, which makes it very difficult to perform molding with high precision.

The present invention has been made in view of such circumstances and provides a granular material for a fused deposition three-dimensional printer that enables a flexible molded object to be manufactured with high precision.

(Second Viewpoint)

In Patent Literature 3, the restoring force of the modeled object is enhanced by adding an inorganic filler to the shape memory polymer, but it is desired to further enhance the restoring force.

The present invention has been made in view of such circumstances and provides a filament that can form a modeled object with high restoring force.

(First Viewpoint)

According to the present invention, provided is a granular material for a fused deposition three-dimensional printer, wherein the granular material is formed of a thermoplastic elastomer, and the thermoplastic elastomer has, at at least one of the measurement temperature of 120 to 270° C., a loss tangent tan δ of 0.40 or more and a loss modulus G" of 11000 Pa or less, which are measured with a rotary rheometer having a pair of parallel plates with a diameter of 20 mm and a measurement gap of 1.3 mm at a frequency of 1 Hz.

The first feature of the first viewpoint is that the material is not filament but a granular material. The granular material of the present invention can be melted using an extruder with a screw and extruded from a nozzle, so that there is no need to use the linear reinforcing portion used in Patent Literature 2, and there is no need for the step of dissolving the linear reinforcing portion from the molded object.

The second feature of the first viewpoint is that the thermoplastic elastomer has a specific viscoelasticity. When the thermoplastic elastomer having the viscoelasticity in the range defined in the present invention is used, a flexible molded object can be manufactured with high precision by adjusting molding temperature.

Hereinafter, various embodiments of the present invention will be exemplified. The embodiments shown hereinafter can be combined with each other.

Preferably, in the afore-mentioned granular material, the thermoplastic elastomer has, at at least one of the measurement temperature of 120 to 230° C., the loss tangent tan δ of 0.40 or more and the loss modulus G" of 8000 Pa or less.

Preferably, in the afore-mentioned granular material, the thermoplastic elastomer has the loss modulus G" of 600 to 4500 Pa at at least one point of the measurement temperature of 120 to 230° C.

Preferably, in the afore-mentioned granular material, the thermoplastic elastomer has a Shore A hardness of 0 to 10.

Preferably, provided is a manufacturing method of a molded object, comprising: a running step of running a strand formed by extruding, from a nozzle, the granular material melted in an extruder with a screw.

Preferably, in the afore-mentioned method, the strand has, at molding temperature, a loss tangent tan δ of 0.40 or more and a loss modulus G" of 11000 Pa or less, which are measured with a rotary rheometer having a pair of parallel plates with a diameter of 20 mm and a measurement gap of 1.3 mm at a frequency of 1 Hz, and the molding temperature is a temperature of the strand immediately after being extruded from the nozzle.

Preferably, in the afore-mentioned method, the thermoplastic elastomer has the loss modulus G" of 8000 Pa or less at the molding temperature.

Preferably, in the afore-mentioned method, a laminated structure is formed by laminating single-layer structures formed by performing the running step, the single-layer structures each comprise a plurality of parallel line portions spaced apart from each other, and two single-layer structures adjacent to each other in a vertical direction are provided so that pluralities of parallel line portions of the two single-layer structures intersect with each other.

Preferably, in the afore-mentioned method, a pitch ratio defined as a ratio of a pitch of the parallel line portions to a line width of the parallel line portions is 1.5 to 6.

(Second Viewpoint)

According to the present invention, provided is a filament comprising a continuous reinforcing fiber and a shape memory polymer.

As a result of intensive studies by the present inventor, it has been found that the model object formed by using the filament containing the continuous reinforcing fiber and the shape memory polymer has a high restoring force, and the present invention has been completed.

Hereinafter, various embodiments of the present invention will be exemplified. The embodiments shown hereinafter can be combined with each other.

Preferably, in the afore-mentioned filament, the filament comprises a continuous fiber bundle which is a bundle of continuous fibers, and the continuous fiber bundle contains the continuous reinforcing fiber as the continuous fiber.

Preferably, in the afore-mentioned filament, the filament comprises a coating layer which covers the continuous fiber bundle, and the coating layer contains the shape memory polymer.

Preferably, in the afore-mentioned filament, the continuous fiber bundle contains a continuous resin fiber as the continuous fiber.

Preferably, in the afore-mentioned filament, the continuous resin fiber contains the shape memory polymer.

Preferably, in the afore-mentioned filament, the continuous reinforcing fiber is a carbon fiber.

BRIEF DESCRIPTION OF DRAWINGS

FIG. 9 is a perspective view of a head 14 that heats the filament 11 to make a molten filament 11a, and a cutter 15 for cutting the molten filament 11a.

DETAILED DESCRIPTION

Hereinafter, embodiments of the present invention will be described. Various characteristics described in the following embodiments can be combined with each other. Further, the invention is independently established for each characteristic.

Embodiment of First Viewpoint

1. Granular Material for Heat-Fusion Type Three-Dimensional Printer

Figure 1A:
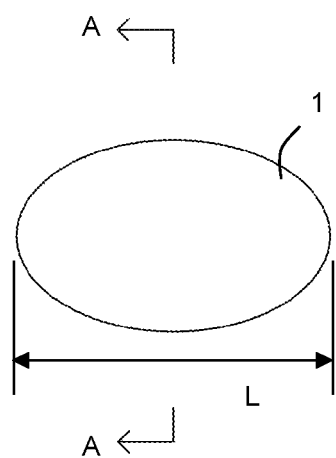
FIG. 1A shows an example of the shape of a granular material of an embodiment of the first viewpoint.
Figure 1B:
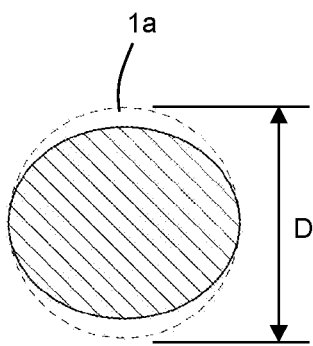
FIG. 1B is a cross-sectional view taken along A-A line in FIG. 1A.

A granular material 11 for a fused deposition three-dimensional printer of an embodiment of the present invention shown in FIG. 1A and FIG. 1B is formed of a thermoplastic elastomer. This thermoplastic elastomer has, at at least one of the measurement temperature of 120 to 270° C., a loss tangent tan δ of 0.40 or more and a loss modulus G" of 11000 Pa or less, which are measured with a rotary rheometer having a pair of parallel plates with a diameter of 20 mm and a measurement gap of 1.3 mm at a frequency of 1 Hz. The details will be described below.

The granular material 1 of the present embodiment is not in the form of thread, such a filament, but in a granular form that can be easily fed into an extruder with a screw. As shown in FIG. 1A and FIG. 1B, L/D is, for example, 1 to 10 and preferably 1 to 5 where L represents the length of the longest part of a grain constituting the granular material, and D represents the diameter of the largest circumscribed circle 1a in a plane perpendicular to the longest part. L is, for example, 0.5 to 10 mm, preferably 1 to 6 mm, and more preferably 2 to 4 mm. L/D is specifically, for example, 1, 2, 3, 4, 5, 6, 7, 8, 9, 10 and may be within a range between any two of the values exemplified herein. L is specifically, for example, 0.5, 1, 2, 3, 4, 5, 6, 7, 8, 9, 10 mm and may be within a range between any two of the values exemplified herein.

Examples of the thermoplastic elastomer forming the granular material 1 include styrenic elastomers, olefinic elastomers, and acrylic elastomers. This thermoplastic elastomer preferably contains a styrenic elastomer. Since the styrenic elastomer has high flexibility, the flexibility of the thermoplastic elastomer increases when the thermoplastic elastomer contains the styrenic elastomer. The percentage of the styrenic elastomer in the thermoplastic elastomer is preferably 50 to 100% by mass, more preferably 80 to 100% by mass, specifically, for example, 50, 60, 70, 80, 90, 100% by mass and may be within a range between any two of the values exemplified herein.

The styrenic elastomer is a thermoplastic elastomer containing a styrene unit, and examples include one of or a blend of two or more of styrenic copolymers (e.g., styrene-ethylene-styrene block copolymer (SES), styrene-butadiene-styrene block copolymer (SBS), styrene-isoprene-styrene block copolymer (SIS), styrene-butadiene rubber (SBR), and the like) and hydrogenated styrenic copolymers (e.g., styrene-ethylene-propylene-styrene block copolymer (SEPS), styrene-ethylene-butylene-styrene block copolymer (SEBS) styrene-butylene-butadiene-styrene block copolymer (SBBS), hydrogenated styrene-butadiene rubber (HSBR), and the like).

The Shore A hardness of the thermoplastic elastomer is preferably 0 to 10, specifically, for example, 0, 1, 2, 3, 4, 5, 6, 7, 8, 9, 10 and may be within a range between any two of the values exemplified herein. When the Shore A hardness is within this range, a molded object with more excellent flexibility can be obtained. The Shore A hardness is measured in accordance with JIS K6253.

The viscoelasticity of the thermoplastic elastomer is measured according to JIS K 7244-10. Specifically, the viscoelasticity is measured with a rotary rheometer having a pair of parallel plates with a diameter of 20 mm and a measurement gap of 1.3 mm at a frequency of 1 Hz while raising the temperature from of 40 to 280° C. at a rate of temperature rise of 2° C./min. The viscoelasticity includes a loss modulus G" (Pa), and a loss tangent tan δ (=G"/G') calculated from the loss modulus G" (Pa) and a storage elastic modulus G' (Pa) at the measurement temperature of 120 to 270° C.

As will be described later, when the loss tangent tan δ at the modeling temperature is 0.40 or more and the loss modulus G" is 11000 Pa or less, the molded object can be manufactured with high precision by the fused deposition three-dimensional printer even if the distance between line portions constituting the molded object is relatively large. Further, the molding temperature in the fused deposition three-dimensional printer is usually 120 to 270° C. Therefore, if the loss modulus G" and the loss tangent tan δ of the thermoplastic elastomer satisfies the above condition, the molded object can be manufactured with high precision by appropriately adjusting the molding temperature. In an embodiment, the storage modulus G' may be considered.

Further, since the modeling is easy when the modeling temperature is relatively low, it is preferable that the modeling can be performed at 120 to 230° C. Therefore, when the loss modulus G" at a molding temperature of 120 to 230° C. is 8000 Pa or less, 600 to 4500 Pa, particularly 700 to 2000 Pa, the molded product can be manufactured with particularly high accuracy at a relatively low temperature. Therefore, the loss modulus G" of the thermoplastic elastomer is preferably 8000 Pa or less, more preferably 600 to 4500 Pa, and further preferably 700 to 2000 Pa at at least one of the measured temperatures of 120 to 230° C.

The above-mentioned measurement temperature is specifically, for example, 120, 125, 130, 135, 140, 145, 150, 155, 158, 160, 165, 170, 175, 180, 185, 190, 195, 200, 205, 210, 215, 220, 225, 230, 235, 240, 245, 250, 255, 260, 265, 270° C. and may be within a range between any two of the values exemplified herein. The loss tangent tan δ is specifically, for example, 0.45, 0.50, 0.55, 0.60, 0.65, 0.70, 0.75, 0.80, 0.85, 0.90, 0.95, 1.00, 1.5, 2.0, 2.5, 3.0, 3.5, 4.0, 4.5, 5.0, 5.5, 6.0, 6.5, 7.0 and may be within a range between any two of the values exemplified herein. The loss modulus G" is specifically, for example, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000 Pa and may be within a range between any two of the values exemplified herein.

The temperature range where the loss tangent tan δ and the loss modulus G" are within the above-mentioned range is preferably 10° C. or higher and more preferably 20° C. or higher. In such a case, the setting of the molding temperature can be facilitated. This temperature range is, for example, 10 to 50° C., specifically, for example, 10, 15, 20, 25, 30, 35, 40, 45, 50° C. and may be within a range between any two of the values exemplified herein.

2. Manufacturing Method of Molded Object

Figure 2:
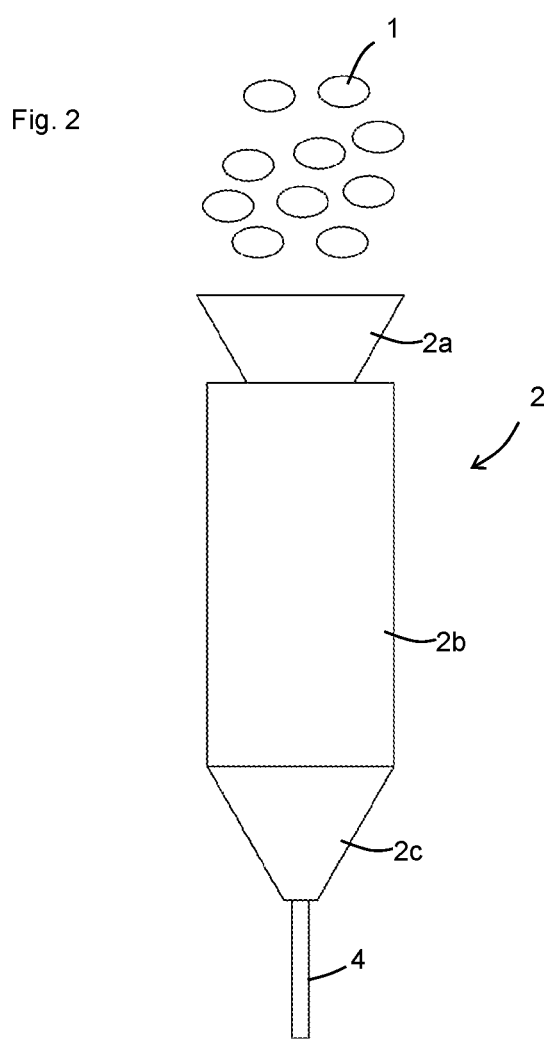
FIG. 2 is an explanatory diagram showing the state where a granular material 1 is fed into an extruder 2 of a fused deposition three-dimensional printer available in the first viewpoint to form a strand 4.

As shown in FIG. 2, a manufacturing method of the molded object according to an embodiment of the present invention includes a running step of running a strand 4 formed by melting the granular material 1 described above in an extruder 2 with a screw and extruding it from a nozzle 2c. The strand 4 is extruded and scanned in a molten state The extruder 2 includes a hopper 2a, a cylinder 2b, and the nozzle 2c. The granular material 1 is fed into the cylinder 2b from the hopper 2a and is heated in the cylinder 2b and melted to become molten material. This molten material is conveyed toward a distal end of the cylinder 2b by the rotation of a screw arranged in the cylinder 2b and is extruded from the nozzle 2c provided at the distal end of the cylinder 2b to become the strand 4. With such a method, the strand 4 can be easily formed even when a highly flexible material, such as thermoplastic elastomer, is used.

The strand 4 has a linear shape, and its diameter is, for example, 0.5 to 6.0 mm and preferably 1.0 to 4.0 mm. This diameter is specifically, for example, 0.5, 1.0, 1.5, 2.0, 2.5, 3.0, 3.5, 4.0, 4.5, 5.0, 5.5, 6.0 mm and may be within a range between any two of the values exemplified herein.

The molded object can be manufactured by running the strand 4 so as to form the desired molded object and cooling and solidifying the scanned strand 4. The cooling may be natural cooling or forced cooling.

The molding temperature is defined as the temperature of the strand 4 immediately after being extruded from the nozzle 2c. The molding temperature is preferably 120 to 270° C. This is because, within such a range, the strand 4 can be sufficiently solidified during cooling, and the deterioration of molding material due to heating is less likely to occur. The strand 4 at the molding temperature preferably the loss tangent tan δ of 0.40 or more and the loss modulus G" of 11000 Pa or less. When the modeling temperature is relatively low temperature of 120 to 230° C., the strand 4 preferably the loss modulus G" of 8000 Pa or less, more preferably 600 to 4500 Pa, further preferably 700 to 2000 Pa. As will be shown in Examples described later, molding precision is particularly high when the loss tangent tan δ and the loss modulus G" at the molding temperature are within these range.

The above-mentioned molding temperature is specifically, for example, 120, 125, 130, 135, 140, 145, 150, 155, 158, 160, 165, 170, 175, 180, 185, 190, 195, 200, 205, 210, 215, 220, 225, 230, 235, 240, 245, 250, 255, 260, 265, 270° C. and may be within a range between any two of the values exemplified herein. The loss tangent tan δ is specifically, for example, 0.45, 0.50, 0.55, 0.60, 0.65, 0.70, 0.75, 0.80, 0.85, 0.90, 0.95, 1.00, 1.5, 2.0, 2.5, 3.0, 3.5, 4.0, 4.5, 5.0, 5.5, 6.0, 6.5, 7.0 and may be within a range between any two of the values exemplified herein. The loss modulus G" is specifically, for example, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000 Pa and may be within a range between any two of the values exemplified herein.

Figure 3A:
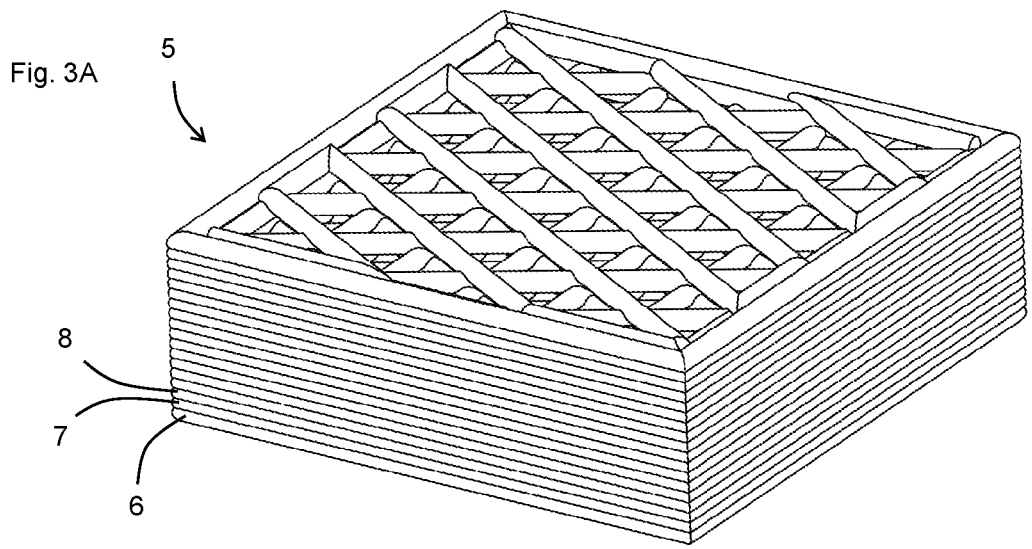
FIG. 3A shows a prospective view of laminated structure 5 in a reticulated shape.
Figure 3B:
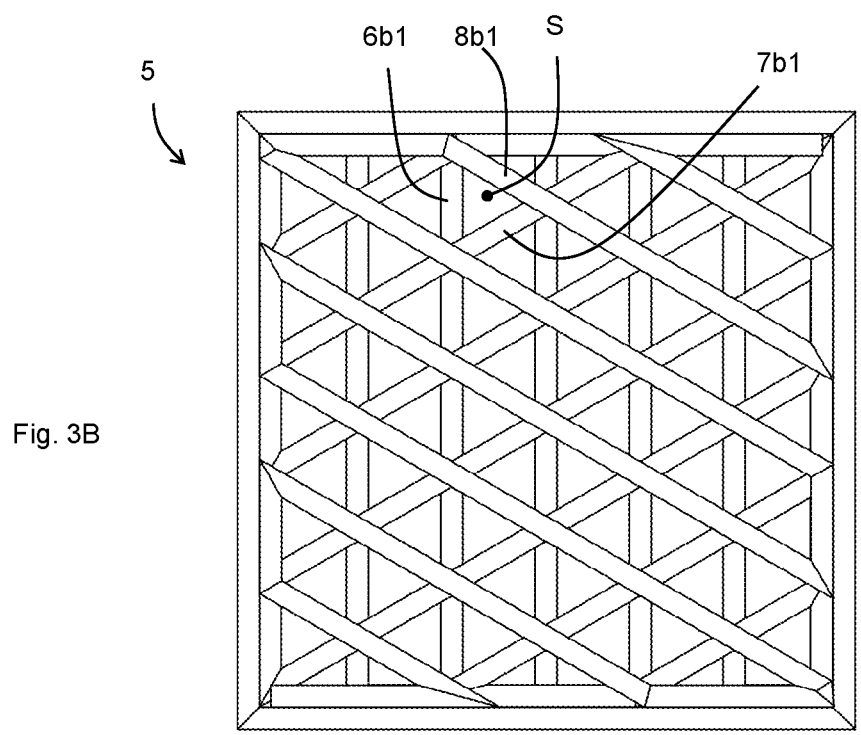
FIG. 3B shows a plan view of laminated structure 5 in a reticulated shape.

FIG. 3A and FIG. 3B show a molded object composed of a laminated structure 5 in a reticulated shape (in a mesh shape). The laminated structure 5 is formed by laminating single-layer structures 6, 7, 8 formed by the above-mentioned running step.

Figure 4A:
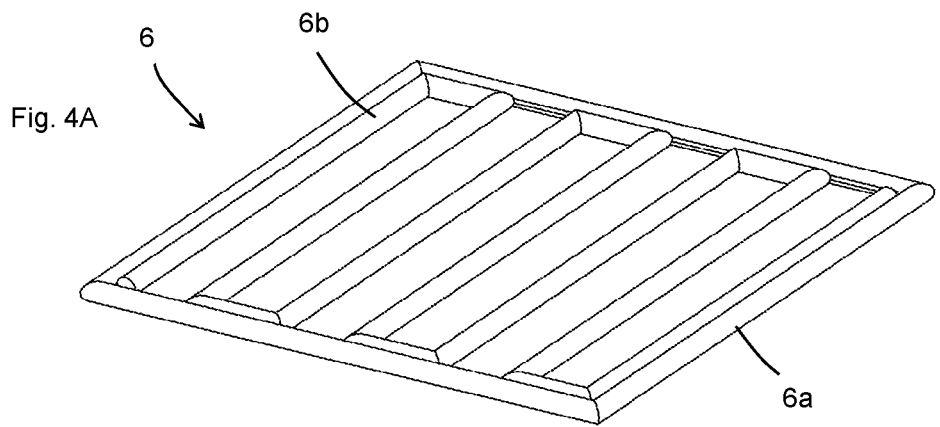
FIG. 4A shows a single-layer structure 6 in a perspective view.
Figure 4B:
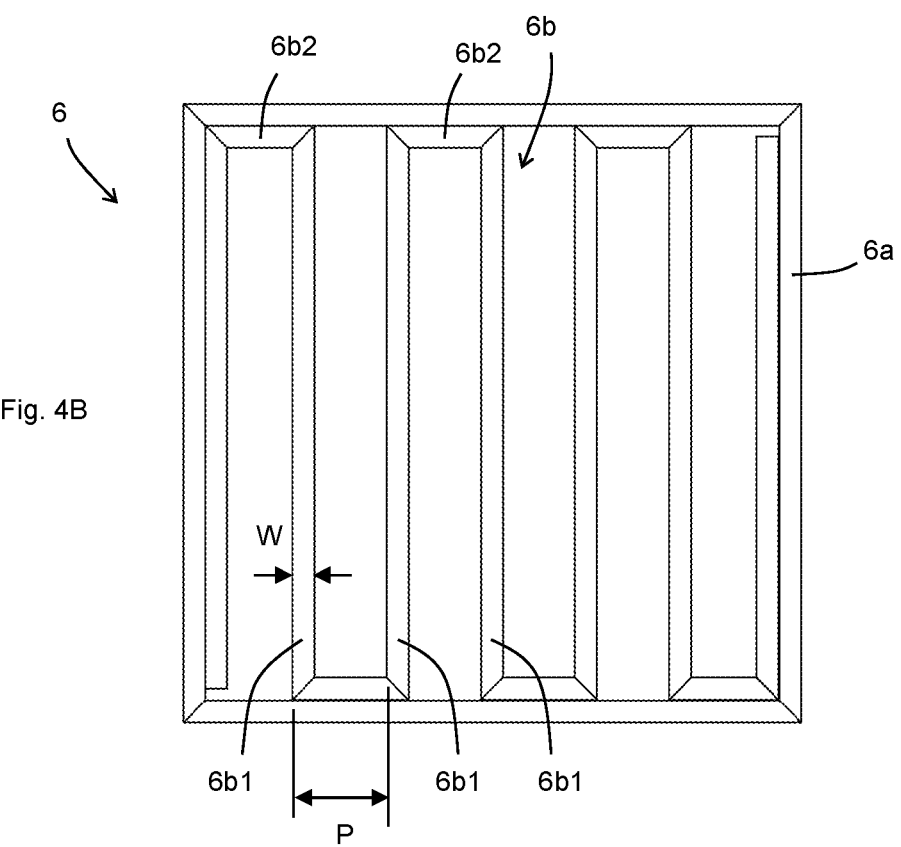
FIG. 4B shows a single-layer structure 6 in a plan view.

The single-layer structure 6 shown in FIG. 4A and FIG. 4B includes an outer circumferential line portion 6a and an inner line portion 6b. The outer circumferential line portion 6a and the inner line portion 6b are each formed by cooling the strand 4, and their line width is approximately equal to the diameter of the strand 4. The inner line portion 6b is provided within a region surrounded by the outer circumferential line portion 6a. The outer circumferential line portion 6a and the inner line portion 6b are welded to each other. It is preferable to form the outer circumferential line portion 6a and the inner line portion 6b respectively by a single stroke so as not to stop the extrusion the strand 4, and it is more preferable to form the entire single-layer structure 6 by a single stroke. In such a case, the number of times the extrusion of the strand 4 is stopped is reduced, which improves the modeling precision and productivity.

The inner line portion 6b includes a plurality of parallel line portions 6b1 spaced apart from each other and connecting line portions 6b2 each connecting the adjacent parallel line portions 6b1. As shown in FIG. 4B, the pitch ratio, which is the ratio of a pitch P of the parallel line portions 6b1 to the line width W of the parallel line portions 6b1, is preferably 1.5 to 6 and more preferably 2.0 to 5.0. If the pitch ratio is too small, the flexibility of the molded object may be insufficient, and if the pitch ratio is too large, modeling may be difficult. The pitch ratio is specifically, for example, 1.5, 2.0, 2.5, 3.0, 3.5, 4.0, 4.5, 5.0, 5.5, 6.0 and may be within a range between any two of the values exemplified herein.

Figure 5A:
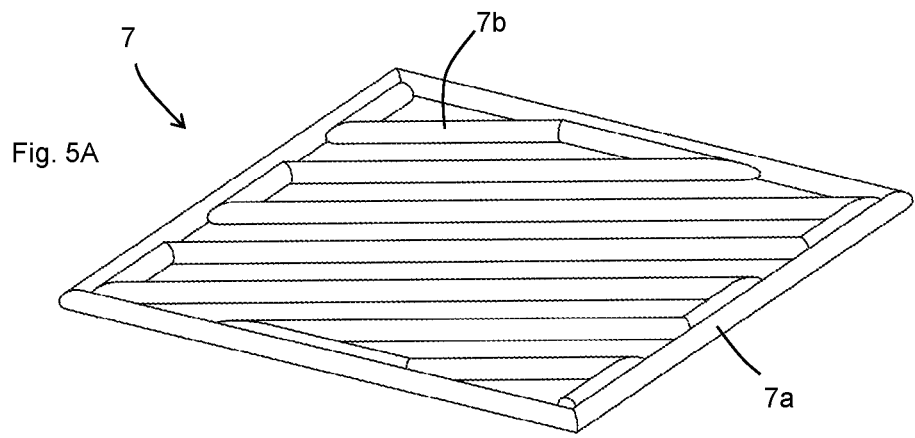
FIG. 5A shows a single-layer structure 7 in a perspective view.
Figure 5B:
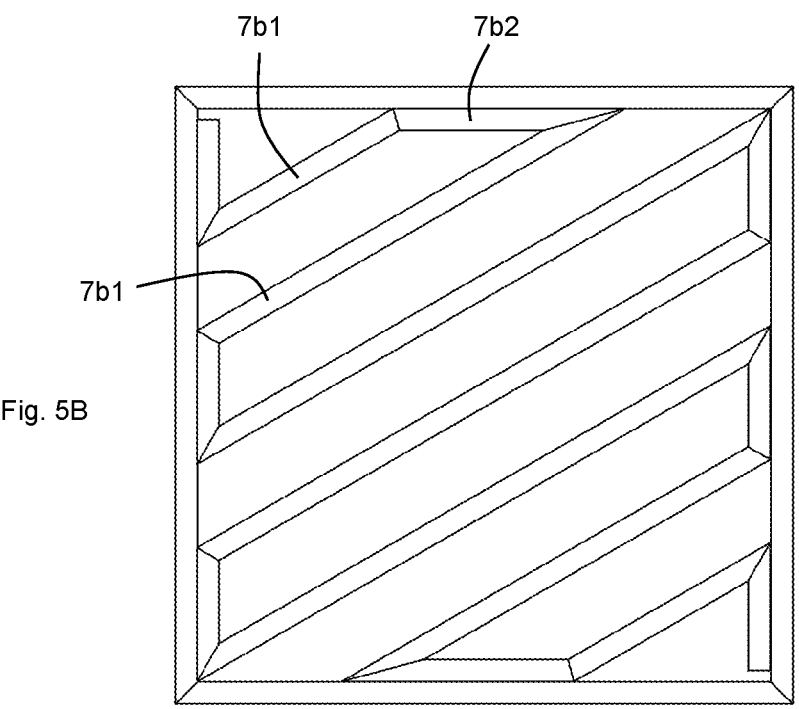
FIG. 5B shows a single-layer structure 7 in a plan view.

The single-layer structure 7 shown in FIG. 5A and FIG. 5B includes an outer circumferential line portion 7a and an inner line portion 7b. The inner line portion 7b includes a plurality of parallel line portions 7b1 and connecting line portions 7b2. The single-layer structure 7 has the same configuration as the single-layer structure 6 except that the direction in which the parallel line portions 7b1 extend is different from that of the parallel line portions 6b1. The parallel line portions 7b1 are formed to intersect with the plurality of parallel line portions 6b1. The larger the above-mentioned pitch ratio, the larger the distance (bridging distance) over which the parallel line portion 7b1 cross the two parallel line portions 6b1, and the more likely the parallel line portion 7b1 will be deflected, resulting in a decrease in molding precision. In the present embodiment, the loss tangent tan δ and the loss modulus G" at the molding temperature are set within the above range to suppress the deterioration of the molding precision due to the deflection of the parallel line portion.

Figure 6A:
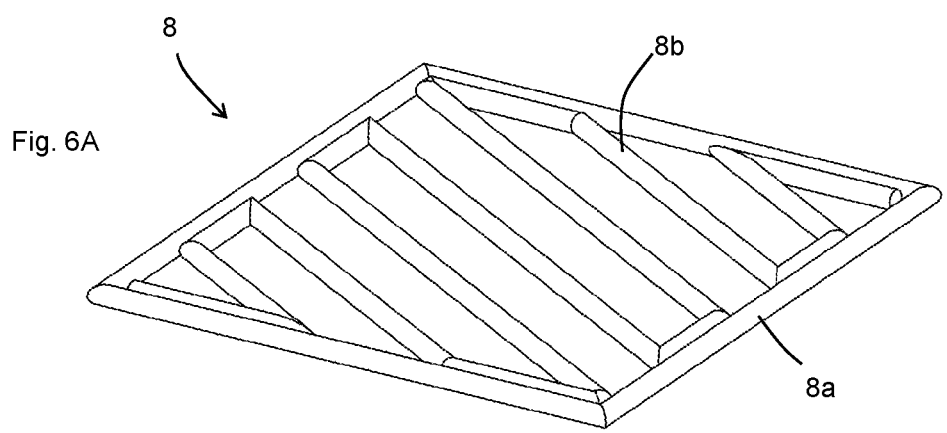
FIG. 6A shows a single-layer structure 8 in a perspective view.
Figure 6B:
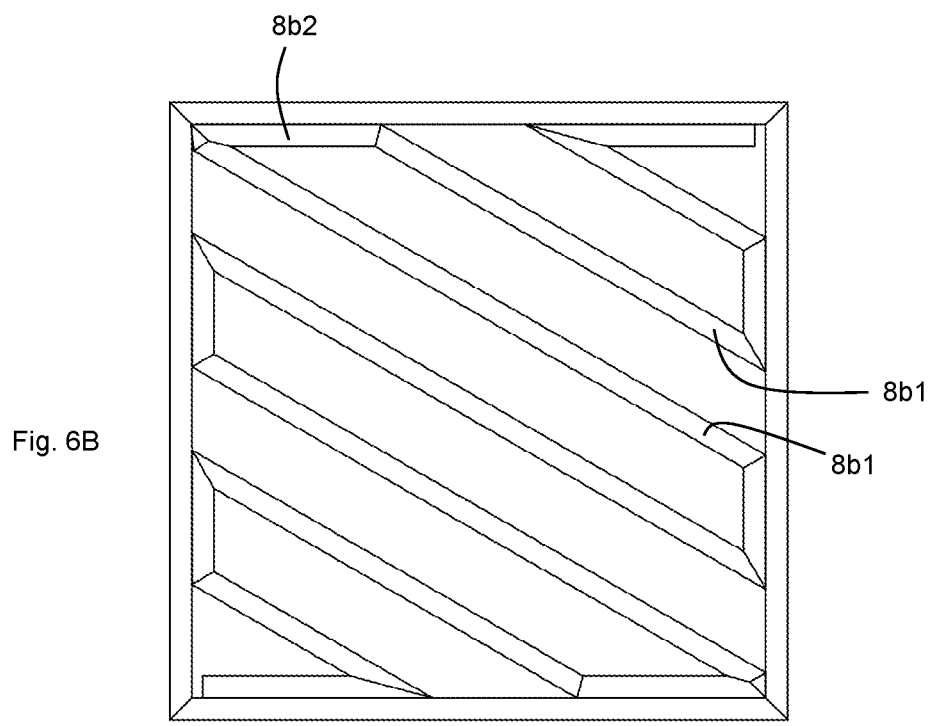
FIG. 6B shows a single-layer structure 8 in a plan view.

The single-layer structure 8 shown in FIG. 6A and FIG. 6B includes an outer circumferential line portion 8a and an inner line portion 18b. The inner line portion 8b includes a plurality of parallel line portions 8b1 and connecting line portions 8b2. The single-layer structure 8 has the same configuration as the single-layer structure 6 except that the direction in which the parallel line portions 8b1 extend is different from that of the parallel line portions 6b1.

The laminated structure 5 is formed by repeatedly laminating the single-layer structures 6, 7, 8 in this order. The parallel line portions 6b1, 7b1, 8b1 are non-parallel to each other, and the parallel line portions of two single-layer structures adjacent to each other in the vertical direction intersect with each other. Further, in the present embodiment, the parallel line portions 6b1, 7b1, 8b1 are shifted by 60 degrees, and their pitches are the same, so that an equilateral-triangular void S is formed in the laminated structure 5 by the parallel line portions 6b1, 7b1, 8b1, as shown in the plan view of FIG. 3B. The larger the above-mentioned pitch ratio, the larger the void S, which improves the flexibility of the molded object.

Embodiment of Second Viewpoint

1. First Embodiment 1-1. Configuration and Manufacturing Method of Filament 11

Figure 7A:
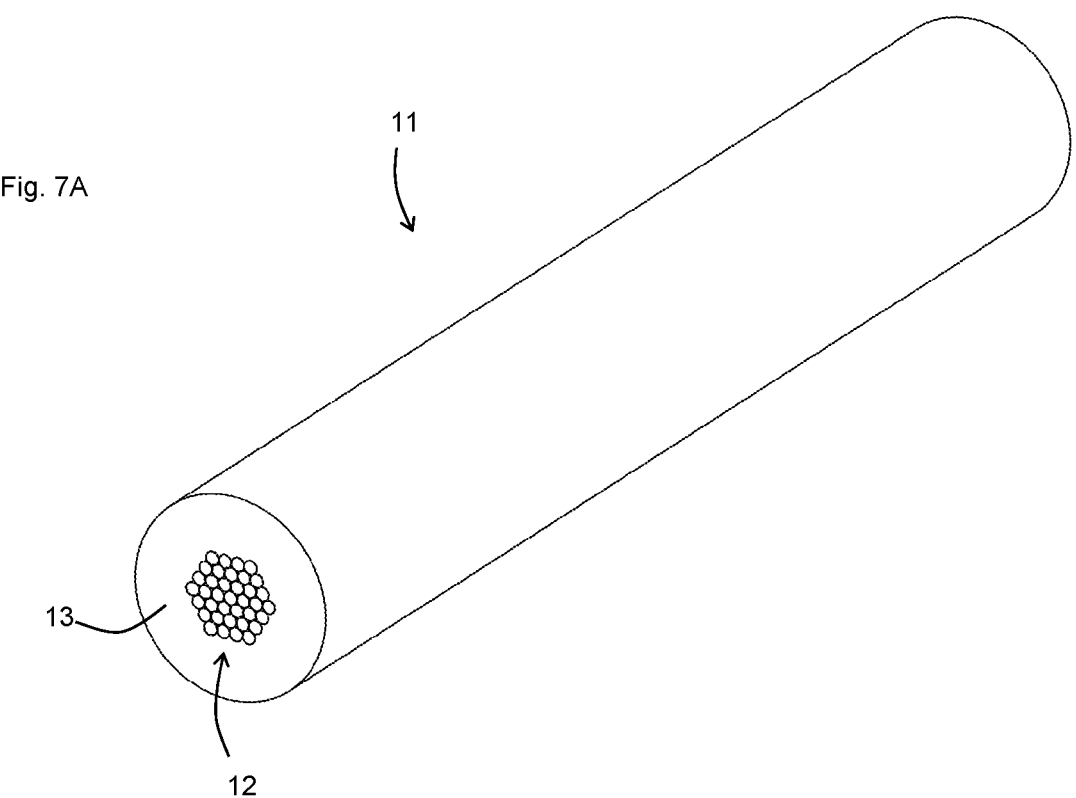
FIG. 7A is a perspective view of a filament 11 of the first embodiment of the second viewpoint.
Figure 7B:
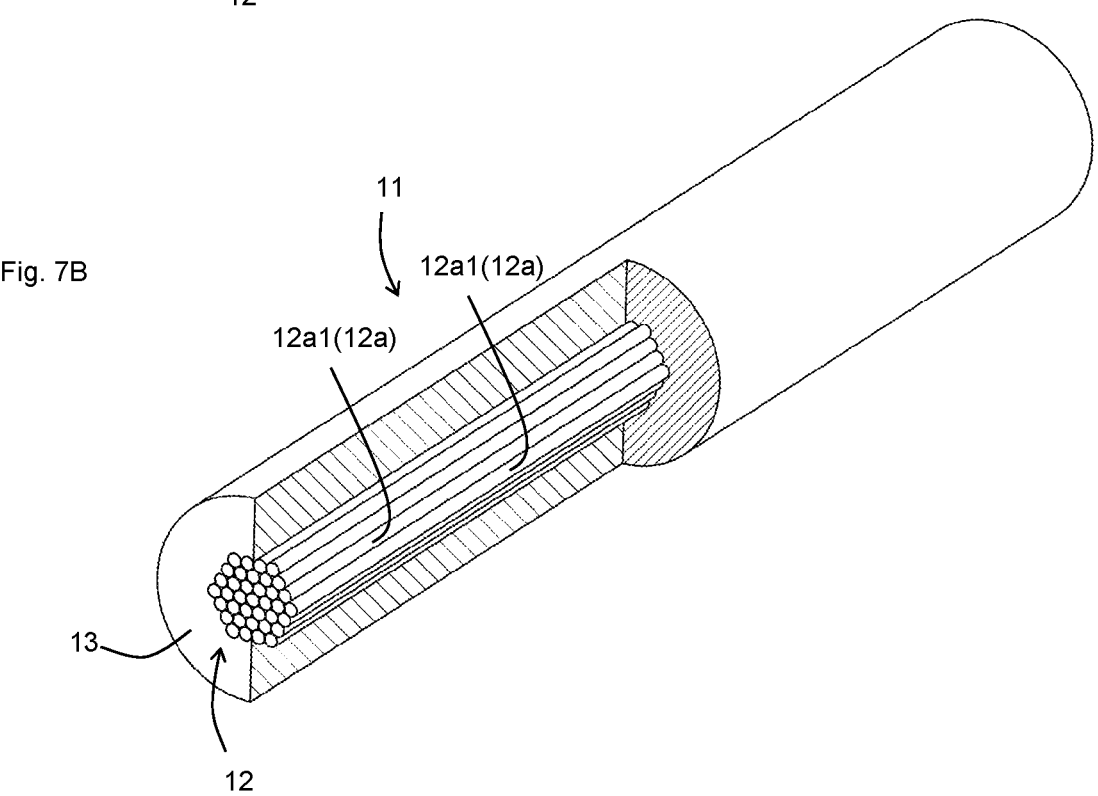
FIG. 7B is a perspective cross-sectional view of the filament 11 of FIG. 7A from which a covering layer 13 is partially cut off.

As shown in FIG. 7, a filament 11 of the first embodiment of the present invention includes a continuous fiber bundle 12 and a coating layer 13 covering the continuous fiber bundle 12.

The continuous fiber bundle 12 is a bundle of continuous fibers 12a. The continuous fiber 12a is a fiber that extends continuously along the longitudinal direction of the filament 11. The fiber length of the continuous fiber 12a is preferably 3 cm or more, more preferably 10 cm or more, further more preferably 1 m or more. Unless otherwise specified, the fiber length in the present invention means a number average fiber length. The continuous fiber 12a is preferably provided over the entire length of the filament 11. The number of continuous fibers 12a contained in the continuous fiber bundle 12 is preferably 10 or more, more preferably 100 or more, further preferably 1000 or more, still more preferably 10,000 or more. The number of continuous fibers 12a is, for example, 1 million or less. Each continuous fiber 12a may be composed of one continuous fiber, or may be a bundle in which a plurality of finer continuous fibers are bundled.

The continuous fiber bundle 12 includes the continuous reinforcing fiber 12a1 as the continuous fiber 12a. The continuous reinforcing fiber 12a1 is a continuous fiber that strengthens the rigidity of the filament 11 without melting during molding.

Examples of the continuous reinforcing fiber 12a1 include inorganic fibers such as glass fiber, carbon fiber, plant fiber (including Kenaf, bamboo fiber and the like), alumina fiber, boron fiber, ceramic fiber and metal fiber (steel fiber and the like), and organic fibers such as aramid fiber, polyoxymethylene fiber, aromatic polyamide fiber, polyparaphenylene benzobisoxazole fiber, and ultra-high molecular weight polyethylene fiber. The continuous reinforcing fiber 12a1 may be composed of only the inorganic fiber or only the organic fiber, and may contain both the inorganic fiber and the organic fiber. Further, the continuous reinforcing fiber 12a1 preferably contains at least one of carbon fiber and glass fiber, and more preferably contains carbon fiber.

The coating layer 13 is formed of a shape memory material containing a shape memory polymer. The shape memory material is a material having shape memory property and has the property of returning to the original shape by elasticity when heated to a predetermined recovery temperature or higher. The shape memory material preferably contains only a shape memory polymer but may contain other components as long as the shape memory property are not impaired. Examples of the component other than the shape memory polymer include resins such as polyolefins such as polyethylene and polypropylene, fillers and the like. The proportion of the shape memory polymer in the shape memory material is, for example, 50 to 100% by mass, specifically, for example, 50, 55, 60, 65, 70, 75, 80, 85, 90, 95, 100% by mass and may be within a range between any two of the values exemplified herein. The recovery temperature of the shape memory material is usually consistent with the glass transition temperature of the shape memory polymer.

The shape memory polymer has the property of returning to its original shape by elasticity when heated to a temperature exceeding Tg. Tg is, for example, 35 to 100° C., preferably 40 to 75° C., specifically, for example, 35, 40, 45, 50, 55, 60, 65, 70, 75, 80, 85, 90, 95, 100° C. and may be within a range between any two of the values exemplified herein.

When an external force is applied at a temperature exceeding Tg to shape the secondary shape and the temperature is cooled to less than Tg while maintaining the external force, the secondary shape is fixed. At a temperature lower than Tg, the original shape is not restored even if the external force is removed. On the other hand, when the shape memory polymer having the secondary shape is heated to the temperature exceeding Tg and no external force is applied, the shape memory polymer is restored to its original shape by elasticity. The original shape can be set, for example, by melting the shape memory polymer and forming it into a desired shape. Examples of the shape memory polymer include polymers having rubber elasticity, and examples thereof include polynorbornene, transpolyisoprene, styrene-butadiene copolymer, and polyurethane.

The diameter of the filament 11 is, for example, 0.5 to 3 mm, preferably 1 to 2.5 mm, and specifically, for example, 0.5, 1, 1.5, 1.75, 2, 2.5, 3 mm and may be within a range between any two of the values exemplified herein. When the diameter of the filament 11 is D1 and the diameter of the continuous fiber bundle 12 is D2, D2/D1 is preferably 0.1 to 0.9, more preferably 0.2 to 0.5. Specifically, D2/D1 is, for example, 0, 0.1, 0.2, 0.3, 0.4, 0.5, 0.6, 0.7, 0.8, 0.9 and may be within a range between any two of the values exemplified herein.

The proportion of the continuous fiber bundle 12 in the filament 11 is, for example, 1 to 90% by mass, preferably 5 to 30% by mass. Specifically, this proportion is, for example, 1, 2, 5, 10, 15, 20, 25, 30, 35, 40, 45, 50, 55, 60, 65, 70, 75, 80, 85, 90% by mass and may be within a range between any two of the values exemplified herein.

The filament 11 can be manufactured, for example, by coating around the continuous fiber bundle 12 with the shape memory material at the outlet of an extruder to form the coating layer 13. The extruder extrudes the shape memory material.

1-2. Application of Filament 11

Figure 8:
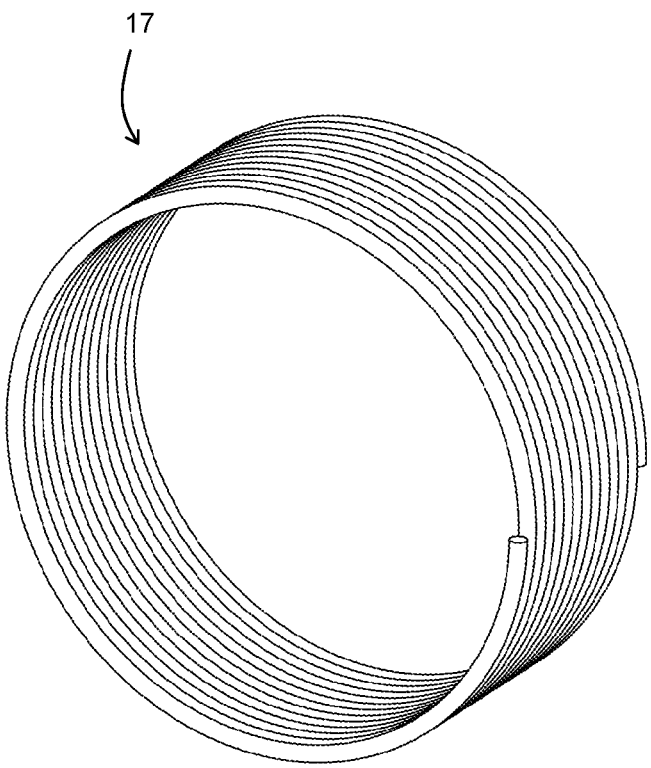
FIG. 8 is a perspective view of a molded object 17.

The filament 11 can be used to manufacture a model 17 having a desired shape as illustrated in FIG. 8 by using a fused deposition three-dimensional printer.

Figure 9:
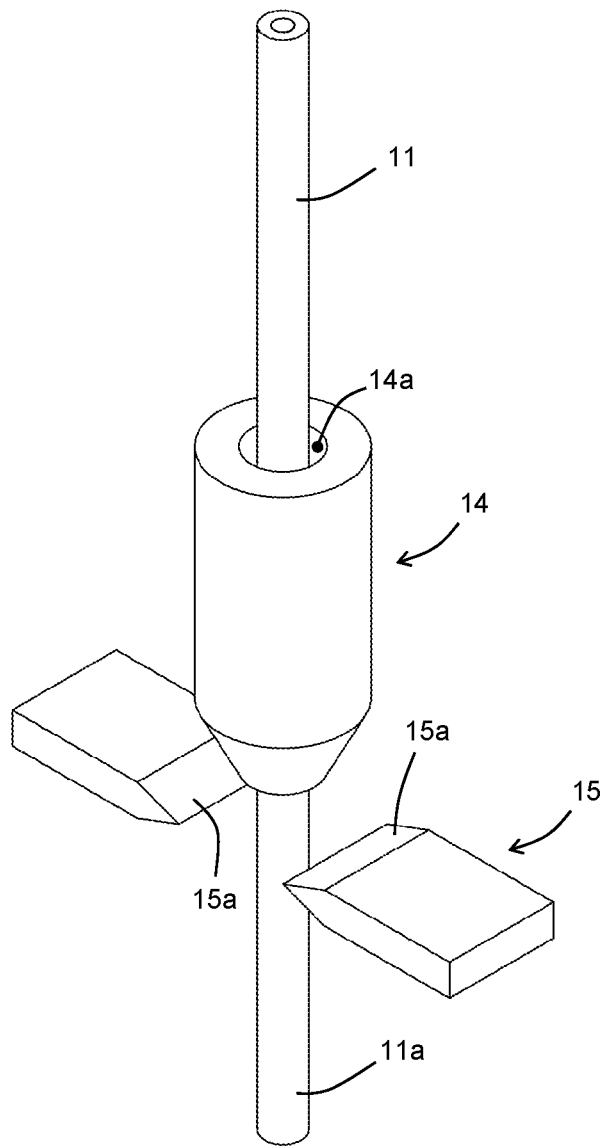

In one example, as shown in FIG. 9, the filament 11 is inserted into the head 14 through an opening 14a provided on the upper side of the head 14. The filament 11 is heated in the head 14 and the molten filament 11a in which the resin component is melted to be in melted state can be extruded from the lower side of the head 14. The molded object 17 can be formed by moving the head 14 relative to a modeling surface (not shown) on which the model object is formed. The molded object 17 of FIG. 8 is obtained by moving the head 14 so that the head 14 draws a circle a plurality of times to form the molten filament 11a into a spiral shape, and depositing the molten resins contained in the molten filament 11a to each other. The molding temperature is, for example, 130 to 270° C. The molding temperature is, specifically, for example, 130, 140, 150, 160, 170, 180, 190, 200, 210, 220, 230, 240, 250, 260, 270° C. and may be within a range between any two of the values exemplified herein.

A cutter 15 is provided immediately below the head 14, and the cutter 15 can be used to cut the molten filament 11a (particularly, the continuous reinforcing fibers 12a1 contained in the molten filament 11a). In an example, the cutter 15 is configured to cut the molten filament 11a by sandwiching the molten filament 11a between a pair of blade portions 15a.

When the temperature of the molded object 17 is Tg or higher, the elastic modulus of the shape memory polymer is significantly reduced, so that the molded object 17 can be freely deformed into the secondary shape. When the molded object 17 is cooled to a temperature of less than Tg while maintaining its shape, its shape is maintained.

Next, when the molded object 17 having the secondary shape is heated to the temperature of Tg or higher, the molded object 17 tends to be restored to its original shape by the elasticity of the shape memory polymer. At that time the greater the restoring force, the higher the restorability of the modeled object 17. Therefore, the larger restoring force is preferable. Further, the larger the restoring force, the smaller the amount of shape memory polymer required for restoration, so that the modeled object 17 can be thinned. Since the model 17 of the present embodiment is formed by using the filament 11 containing the continuous reinforcing fibers 12a1, it has a high restoring force (see Examples and Comparative Examples described later).

2. Second Embodiment

Figure 10:
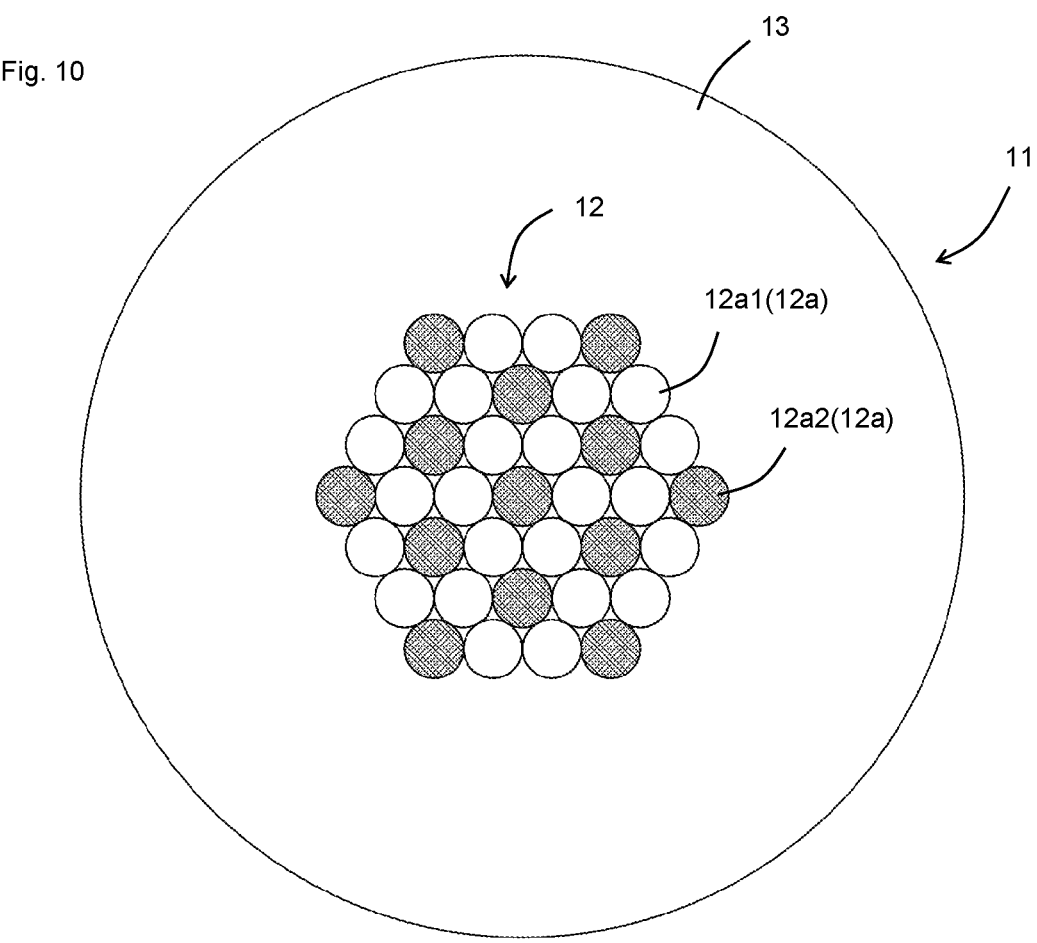
FIG. 10 is an end view of the filament 11 of the second embodiment of the second viewpoint.

The filament 11 of the second embodiment of the present invention will be described with reference to FIG. 10. This embodiment is similar to the first embodiment, and the main difference is the difference in the configuration of the continuous fiber bundle 12. Hereinafter, the differences will be mainly described.

In the present embodiment, the continuous fiber bundle 12 contains a continuous resin fiber 12a2 in addition to the continuous reinforcing fiber 12a1 as the continuous fiber 12a. The continuous resin fiber 12a2 is composed of a resin that melts during modeling. When the continuous fiber bundle 12 contains the continuous resin fiber 12a2, the continuous reinforcing fibers 12a1 are connected to each other with the molten resin obtained by melting the continuous resin fiber 12a2 during modeling, so that the strength of the modeled object 17 is enhanced.

Examples of the resin constituting the continuous resin fiber 12a2 include polyolefins such as polyethylene and polypropylene, aliphatic polyamides such as nylon 6 and nylon 66, semi-aromatic polyamides such as nylon 6T/66, and the shape memory polymer described above. When the continuous resin fiber 12a2 contains the shape memory polymer, the restoring force is enhanced.

When the continuous resin fiber 12a2 contains the shape memory polymer, the coating layer 13 may be made of a resin that does not contain the shape memory polymer. In this case, the coating layer 13 can be made of the above-mentioned polyolefin, aliphatic or semi-aromatic polyamide, or the like. Further, if the molded object 17 can be formed without the covering layer 13, the covering layer 13 can be omitted.

EXAMPLES

Examples of First Viewpoint

Table 1 shows the shore A hardness of the granular material made of the thermoplastic elastomer, and the maximum and minimum values of each measured value for viscoelasticity measured at 120 to 270° C. Table 2 shows the shore A hardness (same as in Table 1) for the granules made of the thermoplastic elastomer, and the maximum and minimum values of the measured values for viscoelasticity measured at 120 to 230° C.

Viscoelasticity was measured according to JIS K 7244-10. Specifically, a sheet of about 100 mm*100 mm*1 mm (depth*width*thickness) was formed by compression molding (equipment: hydraulic molding machine 26 tons, manufactured by Toho press manufacturing limited company), and the molded sheet was cut out into 20 mm*20 mm (depth*width) to be a test piece. The gauge pressure in compression molding is 5 MPa, and each of press temperature for AR-SC-0, AR-815C, G1645MO, AR-SC-5, JS20N, and CJ103 is respectively 130° C., 230° C., 230° C., 150° C., 170° C., and 230° C.

The measurement conditions for viscoelasticity were as follows.
Geometry: a pair of parallel plates with a diameter of 20 mm
Temperature: 40 to 280° C.
Temperature rise rate: 2° C./min
Frequency: 1 Hz (6.28 rad/s)
Gap: 1.3 to 1.4 mm
Setting strain: 0.01
Number of measurements: n=1
Measuring device: MARSIII equipped with a screw extruder at the temperature in Table 3. The temperature in Table 3 is the temperature of the strand 4 immediately after coming out of the nozzle 2c, and was measured using thermography (infrared thermography camera Thermo GEAR, model: G120EX, manufactured by Nippon Avionics Co., Ltd.). The diameter of the strand 4 was 2 mm, the moving speed of the nozzle 2c was 50 mm/s, and the pitch of the parallel lines was 6.5 mm. The line width of the parallel line portion was 2.0 mm. Therefore, the pitch ratio was 3.25.

The obtained modeled object was visually observed, and the formability was evaluated according to the following criteria.
A: No collapse of the shape was observed.
B: A slight collapse of the shape (For example, the corner of the molded object is turned up.) was observed.
C: A collapse of shape was observed, but no significant collapse was observed.
D: Torn of the strand or poor fixation of the strand to the modeling bed occured, or significant collapse of the shape was observed.

As shown in Table 3, when the loss tangent tan δ is 0.40 or more and the loss modulus G" is 11000 Pa or less at the molding temperature, the formability is good. Especially, at

TABLE 1

| Thermoplastic Elastomer | Shore A Hardness | Viscoelasticity at 120 to 270° C. | | | | | |
|---|---|---|---|---|---|---|---|
| | | Storage Modulus G'(Pa) | | Loss Modulus G"(Pa) | | Loss Tangent tan δ | |
| | | maximum | minimum | maximum | minimum | maximum | minimum |
| CJ103 | 15 | 141400 | 38510 | 13810 | 6812 | 0.36 | 0.07 |
| JS20N | 1 | 60650 | 5.4 | 17470 | 21.4 | 16.8 | 0.15 |
| AR-SC-0 | 0 | 11300 | 4.86 | 8135 | 1.37 | 12.0 | 0.26 |
| AR-SC-5 | 3 | 28810 | 6.24 | 11810 | 15.9 | 12.2 | 0.37 |
| AR-815C | 13 | 52180 | 18780 | 6066 | 4537 | 0.25 | 0.11 |
| G1645MO | 35 | 218400 | 1351 | 68390 | 4013 | 2.97 | 0.31 |

TABLE 2

| Thermoplastic Elastomer | Shore A Hardness | Viscoelasticity at 120 to 230° C. | | | | | |
|---|---|---|---|---|---|---|---|
| | | Storage Modulus G'(Pa) | | Loss Modulus G"(Pa) | | Loss Tangent tan δ | |
| | | maximum | minimum | maximum | minimum | maximum | minimum |
| CJ103 | 15 | 141400 | 51090 | 9433 | 6812 | 0.17 | 0.07 |
| JS20N | 1 | 60650 | 35.0 | 17470 | 367 | 10.5 | 0.15 |
| AR-SC-0 | 0 | 11300 | 5.08 | 8135 | 4.96 | 12.0 | 0.65 |
| AR-SC-5 | 3 | 28810 | 6.79 | 11810 | 53.1 | 12.2 | 0.37 |
| AR-815C | 13 | 52180 | 23700 | 6066 | 4800 | 0.20 | 0.11 |
| G1645MO | 35 | 218400 | 10390 | 68390 | 14020 | 1.35 | 0.31 |

Table 3 shows the evaluation of viscoelasticity and formability at each temperature. The formability evaluation was evaluated based on the molded object composed of a laminated structure 5 shown in FIG. 3 prepared by using these granules as a material and a three-dimensional printer a relatively low molding temperature of 120 to 230° C., the formability is good when the loss elastic modulus G" is 8000 Pa or less, the formability is better when the loss modulus is 600 to 4500 Pa, the formability was further better when the loss elastic modulus G" was 700 to 2000 Pa.

TABLE 3

| Thermoplastic Elastomer | Test No. | Temp. (° C.) | Storage Modulus G'(Pa) | Loss Modulus G"(Pa) | Loss Tangent tan δ | Formability Evaluation |
|---|---|---|---|---|---|---|
| CJ103 | 1 | 130 | 126100 | 8916 | 0.07 | D |
|  | 2 | 150 | 75660 | 7092 | 0.09 | D |
|  | 3 | 170 | 68550 | 6913 | 0.10 | D |
|  | 4 | 190 | 65830 | 7557 | 0.11 | D |
|  | 5 | 210 | 61270 | 8478 | 0.14 | D |
|  | 6 | 230 | 51020 | 8988 | 0.18 | D |
| JS20N | 7 | 180 | 6658 | 7546 | 1.13 | C |
|  | 8 | 200 | 3440 | 2336 | 0.68 | B |
|  | 9 | 210 | 2593 | 1299 | 0.50 | A |
|  | 10 | 220 | 458 | 1061 | 2.32 | B |
|  | 11 | 225 | 91 | 558 | 6.12 | C |
| AR-SC-0 | 12 | 125 | 8017 | 7002 | 0.87 | C |
|  | 13 | 140 | 3171 | 2944 | 0.93 | B |
|  | 14 | 150 | 2137 | 1401 | 0.66 | A |
|  | 15 | 155 | 1499 | 1231 | 0.82 | B |
|  | 16 | 158 | 938 | 1160 | 1.24 | C |
| AR-SC-5 | 17 | 155 | 3757 | 5232 | 1.39 | C |
|  | 18 | 170 | 1538 | 2315 | 1.51 | B |
|  | 19 | 190 | 161 | 814 | 5.05 | A |
|  | 20 | 195 | 86 | 582 | 6.77 | B |
|  | 21 | 200 | 52 | 428 | 8.20 | C |
| AR-815C | 22 | 130 | 44030 | 5967 | 0.14 | D |
|  | 23 | 150 | 39990 | 5790 | 0.14 | D |
|  | 24 | 170 | 38190 | 5187 | 0.14 | D |
|  | 25 | 190 | 36410 | 5104 | 0.14 | D |
|  | 26 | 210 | 29530 | 5224 | 0.18 | D |
|  | 27 | 230 | 23640 | 4795 | 0.20 | D |
| G1645MO | 28 | 230 | 10240 | 13850 | 1.35 | D |
|  | 29 | 240 | 7021 | 10170 | 1.45 | C |
|  | 30 | 250 | 4695 | 7698 | 1.64 | B |
|  | 31 | 260 | 2808 | 5770 | 2.06 | A |
|  | 32 | 270 | 1290 | 3926 | 3.04 | B |

Details of the thermoplastic elastomer in the tables are as follows.

CJ103: EARNESTON, manufactured by Kuraray Co., Ltd.
JS20N: EARNESTON, manufactured by Kuraray Co., Ltd.
AR-SC-0: manufactured by Aronkasei Co., Ltd.
AR-SC-5: manufactured by Aronkasei Co., Ltd.
AR-815C: manufactured by Aronkasei Co., Ltd.
G1645MO: manufactured by Kraton Polymer Japan Example of Second Viewpoint 1. Production of Filament 11

Example 1

At the outlet of the extruder that extrudes a shape memory polymer (manufactured by SMP Technologies Inc., model: MM5520), a continuous fiber bundle 12 was coated around with the shape memory polymer to form a coating layer 13 so that a filament 11 having a diameter of 1.75 mm was produced. The carbon fibers (density 1.79 g/cm$^3$, tensile strength 4.12 GPa, tensile elastic modulus 235 GPa) were used as continuously reinforced fibers. The proportion of the continuous fiber bundle 12 in the filament 11 was 9.5% by mass.

Comparative Example 1

A filament 11 having a diameter of 1.75 mm was produced by extruding a shape memory polymer (manufactured by SMP Technologies Inc., model: MM5520) from the extruder.

Comparative Example 2

A material in which 9.5% by mass of carbon fiber (density 1.79 g/cm$^3$, tensile strength 4.12 GPa, tensile elastic modulus 235 GPa) having a fiber length of 6 mm is blended with a shape memory polymer (manufactured by SMP Technologies Inc., model: MM5520) was extruded from the extruder to produce a filament 11 having a diameter of 1.75 mm.

2. Preparation of Sample for Measurement of Restoring Force

Figure 11A:
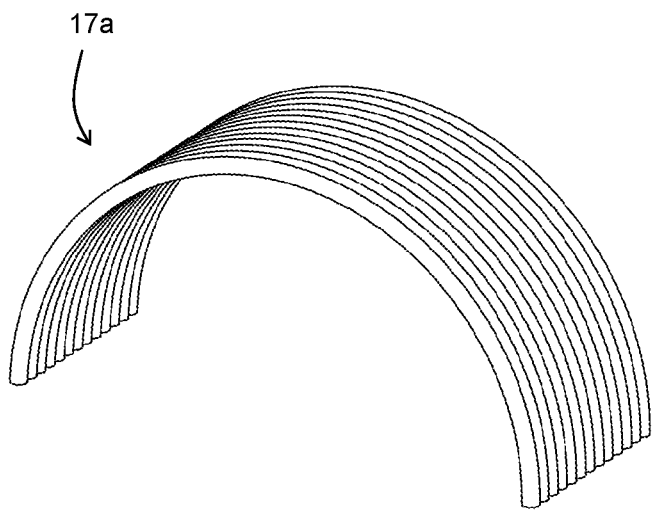
FIG. 11A is a perspective view of an original shape of a sample 17a for measuring the restoring force.

Using the filaments 11 of Examples and Comparative Examples, a molding object 17 (diameter 50 mm, height 20 mm, spiral pitch 1.5 mm) having the shape shown in FIG. 8 was made at a modeling temperature of 210° C. This was cut in half to prepare a sample 17a for measuring the restoring force having the shape shown in FIG. 11A.

3. Measurement of Restoring Force

Figure 11B:
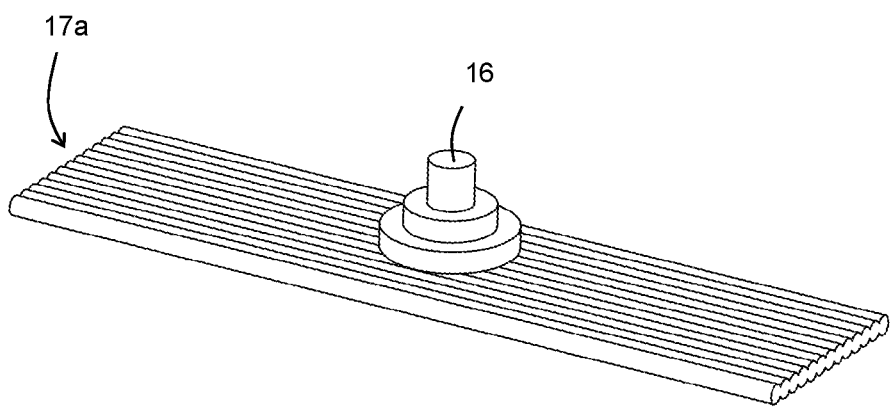
FIG. 11B is a perspective view showing a state in which a force gauge 16 is brought into contact with the upper surface of the sample 17a deformed into a flat shape to measure the restoring force.

As shown in FIG. 11B, the sample 17a was deformed into a flat shape in a state where the sample 17a was soaked in hot water at 67° C. and softened. Next, as shown in FIG. 11B, the force gauge 16 (manufactured by Imada Co., Ltd., model: DS2-50N) is brought into contact with the upper surface of the sample 17a soaked in hot water at 67° C., and the restoring force of 17a was measured. The results are as follows.

Example 1: 1.0N

Comparative Example 1: 0.3N

Comparative Example 2: 0.8N

This result shows that the molding object 17 manufactured by using the filament 11 containing the continuous reinforcing fiber and the shape memory polymer has a high restoring force.

REFERENCE SIGNS LIST

1: granular material for fused deposition three-dimensional printer, 1a: circumscribed circle, 2: extruder with a screw, 2a: hopper, 2b: cylinder, 2c: nozzle, 4: strand, 5: laminated structure, 6: single-layer structure, 6a: outer circumferential line portion, 6b: inner line portion, 6b1: parallel line portion, 6b2: connecting line portion, 7: single-layer structure, 7a: outer circumferential line portion, 7b: inner line portion, 7b1: parallel line portion, 7b2: connecting line portion, 8: single-layer structure, 8a: outer circumferential line portion, 8b: inner line portion, 8b1: parallel line portion, 8b2: connecting line portion, P: pitch, S: void, W: line width, 11: filament, 11a: molten filament, 12: continuous fiber bundle, 12a: continuous fiber, 12a1: continuous reinforcing fiber, 12a2: continuous resin fiber, 13: coating layer, 14: head, 14a: opening, 15: cutter, 15a: blade portion, 16: force gauge, 17: modeled object, 17a: sample.

The invention claimed is:

1. A manufacturing method of a molded object by three-dimensional printing, comprising:
   forming a plurality of single-layer structures including at least a first single-layer structure and a second single-layer structure, by performing a plurality of running steps including at least a first running step and a second running step;
   the first running step comprising forming the first single-layer structure by running a strand formed by extruding, from a nozzle, granular material melted in an extruder with a screw, and
   the second running step comprising forming the second single-layer structure on the first single-layer structure by running the strand formed by extruding, from the nozzle, the granular material melted in the extruder with the screw to form a laminated structure, wherein
   the granular material is formed of a thermoplastic elastomer,
   the thermoplastic elastomer has, at at least one of a measurement temperature of 120 to 270° C., a loss tangent (tan δ) of 0.40 or more and a loss modulus (G") of 11000 Pa or less, which are measured with a rotary rheometer having a setting strain of 0.01 at a frequency of 1 Hz,
   the strand consists of the thermoplastic elastomer,
   the first and second running steps are performed at a molding temperature at which the loss modulus (G") is 582 to 4500 Pa and the loss tangent (tan δ) is 0.40 or more, wherein the molding temperature is a temperature of the strand immediately after being extruded from the nozzle; and
   the thermoplastic elastomer has a Shore A hardness of 0 to 10.

2. The method of claim 1,
   wherein forming the first single-layer structure comprises forming, as the first single-layer structure, a plurality of parallel line portions spaced apart from each other, and
   wherein the second single-layer structure is provided adjacent to the first single-layer structure in a vertical direction so that pluralities of parallel line portions of the first single-layer structure and second single-layer structure intersect with each other.

3. The method of claim 2,
   wherein a pitch ratio defined as a ratio of a pitch of the parallel line portions to a line width of the parallel line portions is 1.5 to 6.

4. The method of claim 1, wherein
   the first running step comprises first melting the granular material in the extruder with the screw, subsequently extruding the strand from the nozzle, and finally running the strand in a molten state, wherein the strand is not solidified between when the strand is formed from the granular material and when the strand is run in the molten state.

5. The method of claim 1, wherein:
   the thermoplastic elastomer has, at at least one of a measurement temperature of 120 to 180° C., the loss modulus (G") of 7000 Pa or less.

6. The method of claim 1, wherein:
   the loss modulus (G") is 582 to 2944 Pa and the loss tangent (tan δ) is 0.50 to 6.77 at the molding temperature; and
   the thermoplastic elastomer has a Shore A hardness of 0 to 3.

7. The method of claim 6, wherein
   the loss modulus G" is 1061 to 2336 Pa and the loss tangent tan δ is 0.50 to 2.32 at the molding temperature.

8. The method of claim 6, wherein
   the loss modulus (G") is 1231 to 2944 Pa and the loss tangent (tan δ) is 0.66 to 0.93 at the molding temperature.

9. The method of claim 6, wherein
   the loss modulus (G") is 582 to 2315 Pa and the loss tangent (tan δ) is 1.51 to 6.77 at the molding temperature.

* * * * *